(12) United States Patent
Knust et al.

(10) Patent No.: US 8,469,296 B2
(45) Date of Patent: Jun. 25, 2013

(54) METHOD AND EQUIPMENT FOR CONDITIONING A HEAVY FRACTION HIGH IN PLASTICS

(75) Inventors: Michael Knust, Isenbuettel (DE); Bram den Dunnen, Braunschweig (DE); Heiner Guschall, Hilchenbach (DE); Daniel Goldman, Goslar (DE)

(73) Assignees: Volkswagen AG, Wolfsburg (DE); Sicon GmbH, Hilchenbach (DE)

( * ) Notice: Subject to any disclaimer, the term of this patent is extended or adjusted under 35 U.S.C. 154(b) by 201 days.

(21) Appl. No.: 12/893,785

(22) Filed: Sep. 29, 2010

(65) Prior Publication Data

US 2011/0042495 A1  Feb. 24, 2011

Related U.S. Application Data

(63) Continuation of application No. PCT/EP2009/001699, filed on Mar. 10, 2009.

(30) Foreign Application Priority Data

Mar. 31, 2008  (DE) .................... 10 2008 016 417
Feb. 20, 2009  (DE) .................... 10 2009 009 873

(51) Int. Cl.
*B02C 7/00* (2006.01)
*B02C 17/02* (2006.01)

(52) U.S. Cl.
USPC ............. 241/24.18; 241/24.13; 241/24.28

(58) Field of Classification Search
USPC ............. 241/24.13, 24.14, 24.18, 24.28
See application file for complete search history.

(56) References Cited

U.S. PATENT DOCUMENTS

| 2,924,473 A | 2/1960 | Krause |
| 3,010,749 A | 11/1961 | Brissette et al. |
| 3,326,551 A | 6/1967 | Clarke |
| 3,378,289 A | 4/1968 | Beckman et al. |
| 3,738,483 A | 6/1973 | MacKenzie |

(Continued)

FOREIGN PATENT DOCUMENTS

| DE | 90 06 995 | 9/1990 |
| DE | 41 00 346 | 7/1992 |

(Continued)

OTHER PUBLICATIONS

International Search Report and Written Opinion, PCT/EP2009/001699, dated Jul. 21, 2009.

(Continued)

*Primary Examiner* — Faye Francis
(74) *Attorney, Agent, or Firm* — Kenyon & Kenyon LLP

(57) ABSTRACT

In a method and equipment for conditioning a heavy fraction high in plastics, which is obtained by conditioning low-metal scrap high in plastics, which originate at least in part from shredder processes of scrap vehicles, the method includes: isolating metal parts from the heavy fraction high in plastics; reducing the size of the metal-reduced heavy fraction high in plastics that remains after the isolation of the metal parts; splitting up of the metal-reduced heavy fraction high in plastics, that remains after the isolation of the metal parts, into fractions high in plastics having different grain sizes; conditioning the separated fractions high in plastics at least partially in separate processes. The equipment includes appropriate devices for carrying out the foregoing processes. A highly pure granulate fraction may be obtained, which may be fed to material utilization.

29 Claims, 4 Drawing Sheets

U.S. PATENT DOCUMENTS

| | | | |
|---|---|---|---|
| 3,905,624 A | 9/1975 | Fujita | |
| 4,026,678 A | 5/1977 | Livingston | |
| 4,242,197 A | 12/1980 | Voelskow et al. | |
| 4,245,999 A | 1/1981 | Reiniger | |
| 4,623,515 A | 11/1986 | Frei et al. | |
| 4,874,134 A | 10/1989 | Wiens | |
| 4,875,724 A | 10/1989 | Gruber | |
| 4,917,420 A | 4/1990 | Rogers, Jr. | |
| 4,936,611 A | 6/1990 | Palvölgyi | |
| 5,184,780 A | 2/1993 | Wiens | |
| 5,348,355 A | 9/1994 | Oyha | |
| 5,445,421 A | 8/1995 | Ferrara | |
| 5,522,554 A | 6/1996 | Blank et al. | |
| 5,527,432 A | 6/1996 | Leuthold et al. | |
| 5,618,069 A | 4/1997 | Konchan et al. | |
| 5,738,393 A | 4/1998 | Chao | |
| 5,853,060 A | 12/1998 | Chao et al. | |
| 5,908,165 A | 6/1999 | Guschall et al. | |
| 6,070,733 A | 6/2000 | Osing | |
| 6,075,000 A | 6/2000 | Rohrbaugh et al. | |
| 6,086,000 A | 7/2000 | Murata | |
| 6,361,091 B1 | 3/2002 | Weschler | |
| 6,372,085 B1 | 4/2002 | Hsu et al. | |
| 6,422,493 B1 | 7/2002 | Simon et al. | |
| 6,422,616 B1 | 7/2002 | Wortmann et al. | |
| 6,547,291 B1 | 4/2003 | Schwaiger | |
| 6,974,097 B2 * | 12/2005 | Simon et al. | 241/19 |
| 7,261,337 B2 | 8/2007 | Nakagome et al. | |
| 7,325,757 B2 * | 2/2008 | Allen et al. | 241/19 |
| 7,780,208 B2 | 8/2010 | Koppenhoehl et al. | |
| 8,267,336 B2 | 9/2012 | Goldmann et al. | |
| 2004/0089102 A1 | 5/2004 | Goldmann et al. | |
| 2004/0251335 A1 | 12/2004 | Goldmann et al. | |
| 2005/0156442 A1 | 7/2005 | Koppenhoehl et al. | |
| 2007/0158242 A1 | 7/2007 | Goldmann et al. | |

FOREIGN PATENT DOCUMENTS

| | | |
|---|---|---|
| DE | 42 05 309 | 8/1993 |
| DE | 42 22 379 | 1/1994 |
| DE | 42 25 670 | 2/1994 |
| DE | 42 39 908 | 3/1994 |
| DE | 43 06 781 | 9/1994 |
| DE | 43 13 570 | 10/1994 |
| DE | 44 26 503 | 2/1996 |
| DE | 44 37 852 | 5/1996 |
| DE | 44 42 631 | 6/1996 |
| DE | 195 00 224 | 7/1996 |
| DE | 196 29 470 | 1/1998 |
| DE | 196 29 473 | 1/1998 |
| DE | 197 55 629 | 6/1999 |
| DE | 199 11 010 | 10/2000 |
| DE | 199 15 481 | 10/2000 |
| DE | 100 54 507 | 5/2002 |
| DE | 102 24 133 | 3/2003 |
| DE | 103 34 646 | 3/2005 |
| DE | 103 36 802 | 3/2005 |
| DE | 10 2004 045 821 | 3/2006 |
| DE | 10 2005 057 820 | 6/2007 |
| EP | 04 18 194 | 3/1991 |
| EP | 0 479 293 | 4/1992 |
| EP | 0 623 390 | 11/1994 |
| EP | 08 84 107 | 12/1998 |
| EP | 1 020 225 | 7/2000 |
| EP | 1 333 931 | 8/2003 |
| EP | 1 337 341 | 8/2003 |
| EP | 1 721 676 | 11/2006 |
| EP | 1 332 001 | 2/2007 |
| JP | 2-229376 | 9/1990 |
| JP | 2-232487 | 9/1990 |
| WO | WO 98/01276 | 1/1998 |
| WO | 02/34400 | 5/2002 |
| WO | 03/070529 | 8/2003 |

OTHER PUBLICATIONS

Search Report, German Patent Application No. 10 2008 016 417.8, dated Oct. 8, 2008.
Search Report, German Patent Application No. 10 2009 009 873.9, dated Nov. 24, 2009.
International Search Report and Written Opinion, issued in corresponding International Application No. PCT/EP2008/009909, 2009.
International Search Report and Written Opinion, issued in corresponding International Application No. PCT/EP2008/002146, 2008.
International Search Report and Written Opinion, dated Jul. 21, 2009, issued in corresponding International Application No. PCT/EP2009/002103.
International Search Report and Written Opinion, dated Jul. 21, 2009, issued in corresponding International Application No. PCT/EP2009/002104.
German Search Report, dated Jun. 2, 2010, issued in corresponding German Patent Application No. 10 2008 026 416.4.
German Search Report, dated Jun. 2, 2010, issued in corresponding German Patent Application No. 10 2008 026 417.2.

* cited by examiner

METHOD AND EQUIPMENT FOR CONDITIONING A HEAVY FRACTION HIGH IN PLASTICS

CROSS-REFERENCE TO RELATED APPLICATIONS

The present application is a continuation of PCT International Patent Application No. PCT/EP2009/001699, filed on Mar. 10, 2009, which is expressly incorporated herein in its entirety by reference thereto.

The present application claims priority to Application No. 10 2008 016 417.8, filed in the Federal Republic of Germany on Mar. 31, 2008, and to Application No. 10 2009 009 873.9, filed in the Federal Republic of Germany on Feb. 20, 2009, each of which is expressly incorporated herein in its entirety by reference thereto.

FIELD OF THE INVENTION

The present invention relates to a method and equipment for conditioning a heavy fraction high in plastics. For example, the present invention relates to a method and equipment for refining a heavy fraction that has been produced during the conditioning of low-metal material mixtures high in plastics, especially a heavy fraction high in plastics having an average bulk material weight of >0.3 t/m$^3$.

BACKGROUND INFORMATION

A method for the conditioning of shredder residues is described, for example, in European Published Patent Application No. 1 332 001. In the method described there therein, in separate preprocessings, conditioning of a light shredder fraction and conditioning of a heavy shredder fraction take place. During the preprocessing of the conditioning of the light shredder fraction, after isolating a foam fraction there takes place a size reduction of the remaining fraction to form a discharge of <50 mm. A ferromagnetic fraction is separated from the reduced size fraction. The remaining nonferromagnetic fraction is fed to a second size reduction process, in which an additional breaking down of the material takes place. From the material that has been well broken down, a sand fraction of <4 mm is separated in a subsequent method step. The remaining fraction undergoes air sizing and density separation, and thus the fraction is separated into a light fraction of lint and a heavy fraction. The heavy shredder fraction is submitted to a separation of the ferromagnetic components. There follows a size classification of the residual flow and the segregation of the nonferrous metal-containing fraction. This may be accomplished in such a way that first a size classification takes place into greater than and less than 20 mm, and these fractions are separately fed to the metal separator. The main point, in this context, is that as clean a substance separation as possible takes place into a nonferrous metal-containing fraction and a remaining fraction that is low in metal. In a subsequent classification the segregation of a sand fraction takes place having a grain diameter less than 6 mm. The remaining coarse grain fraction that is low in metal is subsequently split up into a heavy fraction and a highly dense residual fraction. In the subsequent main process, the heavy fractions (raw granulate) from the two preprocessings are combined. These combined fractions are first broken down in an additional size reduction step. After the size reduction, there is a density separation and the isolation of a fraction consisting predominantly of plastic in a granulated form. The raw granulate present is then conditioned in an additional refining process. In the refining process, there is first a surface purification using water, in an attrition process. In this case, dust that contains heavy metals and adheres to the surface is washed off and concentrated in a sludge fraction. The washed granulate is then dried. After this treatment step, an all-metal separator may optionally be provided, which can separate out the last metal particles contained in the granulate, e.g., copper strands. The granulate thus pretreated is submitted to an electrostatic charging of the granules by friction, which makes possible a PVC isolation, and a granulate fraction is obtained that is low in chlorine and metal, and is able to be fed to material utilization.

SUMMARY

Example embodiments of the present invention provide a method and equipment, using which a heavy fraction low in metal, that has been produced during the conditioning of low-metal material mixtures high in plastics, is refined such that a highly pure end product is obtained for material utilization.

In the method according to an example embodiment of the present invention for conditioning a heavy fraction high in plastics (raw granulate), which has been created in the conditioning of low-metal material mixtures high in plastics substantially by isolating a light plastic fraction (raw lint), at least the following processes are performed one after the other: (a) isolating of metal parts still present, especially such metal parts as were broken down during the conditioning of the low-metal material mixtures high in plastics; (b) reducing the size of the metal-reduced heavy fraction high in plastics that remains after the metal isolation; (c) splitting up the metal-reduced heavy fraction high in plastics, remaining after the metal isolation, into several, e.g., three factions high in plastics, of different grain sizes; and (d) conditioning the separated fractions high in plastics in at least partially separate process steps.

Because of the splitting up of the heavy fraction high in plastics into several fractions high in plastics, having different grain sizes, and their separate conditioning, a prerequisite is created for obtaining highly pure end fractions at the end of the process, whereby, in turn, improved material utilization is made possible.

The conditioning of the separated fractions that are high in plastics may run at least partially in similar processes, which makes possible an improved process control.

The remaining fraction high in plastics may be split up into a first fraction high in plastics, having a grain size in the range of about 0 to 1.7 mm, e.g., having a grain size in the range of about 0 to 1.5 mm, a second fraction high in plastics, having a grain size of about 1.3 mm to 4.2 mm, e.g., in the range of about 1.5 mm to 4.0 mm, and a third fraction high in plastics, having a grain size of about 3.8 mm to 7.2 mm, e.g., having a grain size of about 4.0 mm to 7.0 mm.

The splitting up of the remaining fraction high in plastics into three fractions high in plastics having different grain sizes is not absolutely necessary. One may, for instance, also split up into two or even four fractions high in plastics, then having somewhat different grain size ranges. However, splitting up into three fractions high in plastics (as mentioned above) is believed to be particularly advantageous.

The heavy fraction high in plastics, that is to be conditioned, on average may have a bulk material weight >0.2 t/m$^3$, e.g., a bulk material weight clearly more than 0.4 t/m$^3$.

The separation of the metal parts may take place in two different process steps. In the first process step, the ferromagnetic components of the low-metal fraction high in plastics are separated, and in the second process step, the non-ferromagnetic metal parts. This makes possible a more uniform isolation which, in turn, ensures an improved raw material use of the individual metals.

As the method for isolating the non-ferromagnetic metal parts, eddy current separation may be used and also methods of sensitive metal separation based on the electrical conductivity of the non-ferromagnetic metal parts. The latter method has the advantage that, besides broken down ferromagnetic metal parts, high-grade steel, lead and non-broken down metals are able to be separated. Besides that, the individual metals may be separated separately from one another, and thus may be fed more simply to material utilization.

It may be provided that, after the separating of the metal parts, a process step is provided for separating polyvinyl chloride (PVC), that is high in chlorine, e.g., via the different absorbability of the individual plastics of X-ray radiation.

After the process steps of separating metal parts or separating polyvinyl chloride, there follows the process step of reducing in size the metal-reduced heavy fraction high in plastics to a grain size smaller than, or equal to 8 mm, e.g., smaller than, or equal to 7 mm, this process step being the prerequisite for the separation of the metal-reduced heavy fraction high in plastics into fractions of different grain size. A size reduction method is used in this context, which makes possible breaking down the metals not yet broken down which are contained in the heavy fraction high in plastics at a percentage of >95%, e.g., >99%. The process of size reduction may also be applied in several stages, such as two stages, in each case intermediate buffering being possible. For instance, it is possible to carry out a size reduction to a grain size less than, or equal to 14 mm, e.g., less than, or equal to 12 mm, and subsequently (perhaps after intermediate buffering) a second size reduction to a grain size less than, or equal to 8 mm, e.g., less than, or equal to 7 mm.

The method may include a process step for separating raw lint, e.g., having an average bulk material weight of <0.3 t/m$^3$, for example, <0.2 t/m$^3$, and/or wood particles.

The method may include the splitting up of the metal-reduced heavy fraction high in plastics by sifting, e.g., using at least three sieve layers having different sizes of hole. Sizes of hole or 7.0 mm, 4.0 mm and 1.5 mm may be used in this regard.

After the splitting up of the metal-reduced heavy fraction high in plastics, a process may take place of isolating the raw lint and/or wood particles present for each of the fractions high in plastics of different grain or particle sizes created during the splitting up of the fraction high in plastics. In this case one may do without the isolation of the raw lint and the metal parts before splitting up the heavy fractions high in plastics.

During the conditioning of the separated fraction high in plastics, it may be further provided that the separated fractions high in plastics, separately from each other, undergo a process of density separation, different end or intermediate products being created by the density separation as a function of the fractions high in plastics. Thus, because of the density separation of the fraction high in plastics, having a grain size in the range of about 0 mm to 1.5 mm, there is created, on the one hand, a plastic material that is to be ground, which is, for example, processed further together with the raw lint created during the conditioning of the low-metal plastic scrap having an average bulk material weight <0.2 t/m$^3$. In addition, there is created a fraction including, at least for the most part, non-ferromagnetic metal parts.

During the density separation of the fraction high in plastics, having a grain size in the range of about 1.5 mm to 4.0 mm, there is created a prerefined granulate fraction as well as a non-ferromagnetic metal fraction, which in subsequent process steps may be split up into their individual metal types, e.g., by sifting. One part of the metal fraction thus split up is processed further with a metal fraction that is created during the density separation of the fraction high in plastics having a grain size of about 4.0 mm to 7.0 mm (also see below). The further processing in common may take place by optical sorting, in which the common metal fraction is split up into its individual metal types. An impact treatment may be inserted before the optical sorting, so as to achieve the balling up of the copper strands. This makes possible an increase in efficiency of the optical sorting.

Before the sifting, the non-ferromagnetic metal fractions, created by the density separations in the range of about 1.5 mm to 7.0 mm, may be fed to a segregation of ferromagnetic components, so as possibly to be able to separate, from the non-ferromagnetic metal fractions, still present small section steel (e.g., fine metal wires) and thus increase their degree of purity. Thus, under certain circumstances, there may still be a small proportion of small section steel in the non-ferromagnetic metal fractions, of up to 5%.

As an intermediate product of the density separation of the fraction high in plastics having a grain size of about 4.0 mm to 7.0 mm, there is also created a ferromagnetic metal fraction which is at least partially conditioned together with the metal fraction created during the density separation of the fraction high in plastics having a grain size in the range of about 1.5 mm to 4.0 mm. As a second intermediate product there is created a prerefined granulate fraction, that is, for example, conditioned in common with the granulate fraction which is created by the density separation of the fraction high in plastics having the average grain size.

During the conditioning, the granulate fractions, individually or in common, are submitted to surface purification to remove dust and/or operating fluids (especially fats and oils, which may have already partially diffused into the plastics parts). For example, a process follows the surface purification for isolating a polyvinyl chloride fraction (PVC), especially by wet density separation, as well as a process for separating polyolefins, especially by wet density separation. In a following process step, the rubber parts present may be removed, or may at least be greatly reduced, from the granulate fraction, that has already been greatly refined, by electrostatic isolation. The granulate fraction thus refined, if necessary, may be further reduced in size or ground up, if subsequent processes require it.

The equipment, or system, according to an example embodiment of the present invention for conditioning a heavy fraction high in plastics (raw granulate), that was created during the conditioning of low-metal material mixtures high in plastics, has devices using which one is able to carry out these successive processes: (a) separating metal parts from the heavy fraction high in plastics, and obtaining a plastics fraction reduced in metal; (b) reducing the size of the metal-reduced heavy fraction high in plastics that remains after the separation of the metal parts; (c) splitting up the metal-reduced heavy fraction high in plastics, that remains after the separation of the metal parts, into plastics fractions having different grain sizes; and (d) conditioning the separated fractions high in plastics at least partially in different processes.

Because of the splitting up of the heavy fraction high in plastics into several fractions high in plastics, having different grain sizes, and their separate conditioning, a process prerequisite is created for obtaining highly pure end fractions at the end of the process, whereby, in turn, improved material utilization is made possible.

The device for splitting up the metal-reduced and size-reduced fraction high in plastics is provided such that a first fraction high in plastics, having a grain size in the range of about 0 to 1.7 mm, e.g., having a grain size of about 0 to 1.5 mm, a second fraction high in plastics, having a grain size of about 1.3 mm to 4.2 mm, e.g., in the range of about 1.5 mm to 4.0 mm, and a third fraction high in plastics, having a grain size in the range of about 3.8 mm to 7.2 mm, e.g., having a grain size of about 4.0 mm to 7.0 mm are obtained.

The heavy and low-metal fraction high in plastics (raw granulate), that is to be conditioned, on average may have a bulk material weight >0.2 t/m$^3$, e.g., a bulk material weight clearly >0.4 t/m$^3$.

The device for separating the metal parts from the heavy and low-metal fraction high in plastics may include a device for separating ferromagnetic components in a first method step, e.g., a magnetic separator, particularly a magnetic drum or an overband magnet device as well as subsequently situated device for separating non-ferromagnetic metal parts, e.g., a device for eddy current segregation or for sensitive metal isolation based on the electrical conductivity of the metal parts.

Furthermore, it may be provided that a device for separating polyvinyl chloride (PVC) that is high in chlorine, e.g., a separating device using X-rays, be subsequently situated to the device for separating metal parts.

The device for reducing in size the metal-reduced fraction high in plastics may be provided such that the fraction high in plastics is reduced in size so that one is able to achieve breaking down non-broken down metals, contained in the fraction, of >95%, e.g., 99%.

The device for reducing in size the metal-reduced fraction high in plastics may be provided such that reducing in size of the fraction high in plastics to a grain size less than, or equal to 8.0 mm, e.g., 7 mm, takes place.

After the device for reducing in size the metal-reduced fraction high in plastics, a device is provided for separating raw lint, especially having an average bulk material weight of <0.3 t/m$^3$, e.g., a bulk material weight of <0.2 t/m$^3$. It is not absolutely necessary to arrange for this arrangement at this point in the process sequence. There is also the possibility of arranging it after the splitting up of the metal-reduced fraction high in plastics into fractions high in plastics of different grain or particle size, separately for each of the fractions high in plastics obtained. For example, devices for air sifting are for separating raw lint.

A sifting device having at least three sieve layers of different sizes of hole may be provided as the device for separating the fractions high in plastics having different grain sizes.

After the splitting up of the metal-reduced fractions high in plastics into at least three fractions high in plastics of different grain sizes, or after running through the devices, possibly provided thereafter, for separating the raw lint and/or the wood particles, e.g., by density separation, separate devices may be provided for density separation of the individual separated fractions high in plastics. The device for density separation of the first separated fraction high in plastics, which may have a grain size of about 0 mm to 1.5 mm, is provided such that a non-ferromagnetic metal fraction and material to be ground are obtained. The device for density separation of the second separated fraction high in plastics, which may have a grain of about 1.5 mm to 4.0 mm, and the device, separate from this, for density separation of the third separated fraction high in plastics, e.g., having a grain size of about 4.0 mm to 7.0 mm are provided such that in each case a non-ferromagnetic metal fraction and a prerefined granulate fraction is obtained as the end product, the metal fractions obtained and the granulate fractions obtained in each case being at least in part conditioned further in common.

A device for surface purification of the granulate fractions may be postconnected to the devices for density separation of the second and third fractions high in plastics. This device is arranged such that dust and/or operating fluids (especially fats and oils) sticking to the plastic particles are able to be removed. A device for separating polyvinyl chloride PVC) and after that, a device for separating polyolefins are postconnected in two stages to the device for surface purification, both device being, for example, provided as wet density separation devices. After the device for isolating polyolefins from the plastics fraction, a device is provided for separating rubber particles from the acceptable quality fraction.

Using the equipment described herein, a plastics granulate is obtained by conditioning a raw granulate that is produced by conditioning low metal waste high in plastics, which, based on its degree of purity, is able to be fed to a material utilization having high quality requirements.

Further features and aspects of example embodiments of the present invention are described in more detail below with reference to the appended Figures.

DETAILED DESCRIPTION

Figure 1:
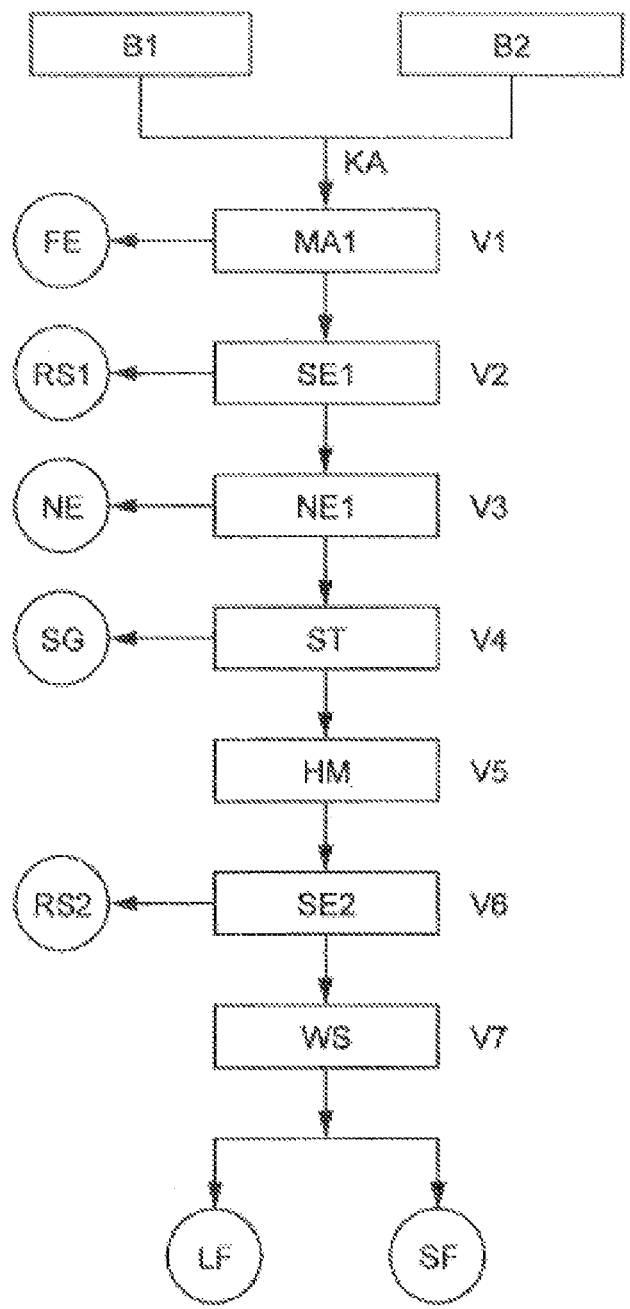
FIG. 1 is a schematic flow chart of successive process steps for obtaining a light fraction high in plastics (raw lint) LF and a heavy fraction high in plastics (raw granulate) SF.

The schematic flow chart shown in FIG. 1 shows the process sequence during the conditioning of low-metal material mixtures KA that are high in plastics, for obtaining a heavy fraction SF high in plastics and a light fraction LF high in plastics which, for example, may be postconnected to a shredder process of scrap vehicles.

Besides low-metal material mixtures high in plastics from a shredder process, other material mixtures high in plastics may also be conditioned with the aid of the method and equipment described herein. In the exploitation of scrap vehicles, metal-containing scrap is initially broken down by a shredder in a, e.g., conventional, preconnected shredding process, by a size reduction process. A light shredder fraction SLF capable of flying is subsequently isolated by a suction device. The heavy material stream, that is not capable of flying, which remains after the suction, is separated on a magnetic separator, into a ferromagnetic and a non-ferromagnetic fraction. The ferromagnetic fraction is designated as shredder scrap, and represents the primary shredder product, which may be used directly in metallurgy. The remaining heavy non-ferromagnetic fraction is designated as heavy shredder fraction SSF.

The light shredder fraction SLF is conditioned further, by itself or together with the heavy shredder fraction SSF and perhaps with additional low-metal plastic material mixtures, and is designated as low-metal, high plastic scrap KA, when submitted to the process. These low-metal, high-plastic material mixtures have a metal proportion of <20%, e.g., a metal proportion of the order of magnitude of 5%.

One or more feed containers B1 and/or B2 are provided for the incoming supply of the low-metal, high-plastics mixed materials, in order to decouple the conditioning process, from upstream processes such as the shredder process.

In a first method step V1, the ferromagnetic components FE are separated, using a magnetic separator MA1, as a ferromagnetic fraction, which may then be fed to a metallurgical processing process, for the reutilization of the material. There then follows isolation V2 of a first raw sand fraction RS1, using a sifting device SE1, which has a size of hole in the range of 10 to 12 mm in the exemplary embodiment. Because of the isolation of this raw sand fraction, the subsequent process steps are relieved with respect to the separated raw sand fraction. After method step V2 there is a process step V3, "segregation of non-ferromagnetic metal components" (non-ferromagnetic metal fraction), such as copper, brass, aluminum, etc. A device ME1 may be used for eddy current separation or for sensitive metal isolation based on the electric conductivity of the metal parts. Subsequent process step V4 of the isolation of coarse components substantially reduces the wear in the next process step V5 of the main size reduction. In process step V4, for isolating coarse components (heavy material) SG, device ST for heavy material separation, so-called air knife systems, may be used. After the isolation of the heavy material SG, in process step V5, a size reduction of the remaining fractions takes place, using a hammer mill MH. The size reduction takes place, in this instance, in that the volume of the light fraction (raw lint) LF contained in the remaining fractions is increased, whereby in a later process step V7 an improved and purer fraction splitting up of the remaining fractions into a light fraction (raw lint) LF and a heavy fraction (raw granulate) SF is made possible. A device (WS) for air sifting is provided for splitting up the remaining fraction. The heavy fraction (raw granulate) SF created has an average bulk material weight >0.2 t/m$^3$, e.g., clearly >0.4 t/m$^3$. Between process step V5 of size reduction, e.g., at 20 mm, and process step V7 of splitting up the remaining fractions, a process step V6 is provided, in which a second raw sand fraction RS2 is separated using a sifting device SE2. The size of hole of sifting device SE2 is, for example, in a range of 4 to 8 mm.

Figure 2:
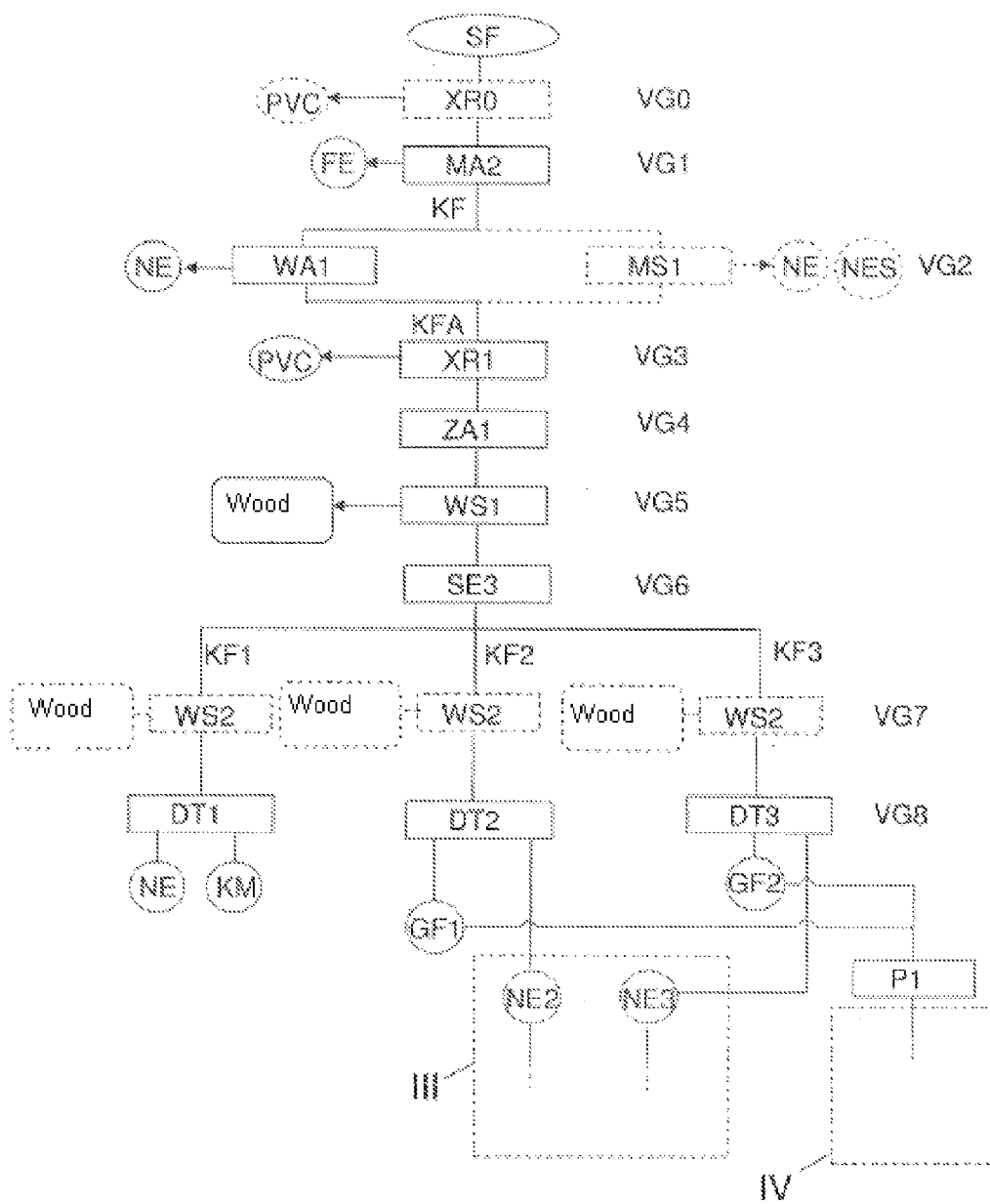
FIG. 2 is a schematic flow chart of successive process steps for conditioning the heavy fraction high in plastics (raw granulate) SF using a detail process III and a detail process IV.
Figure 3:
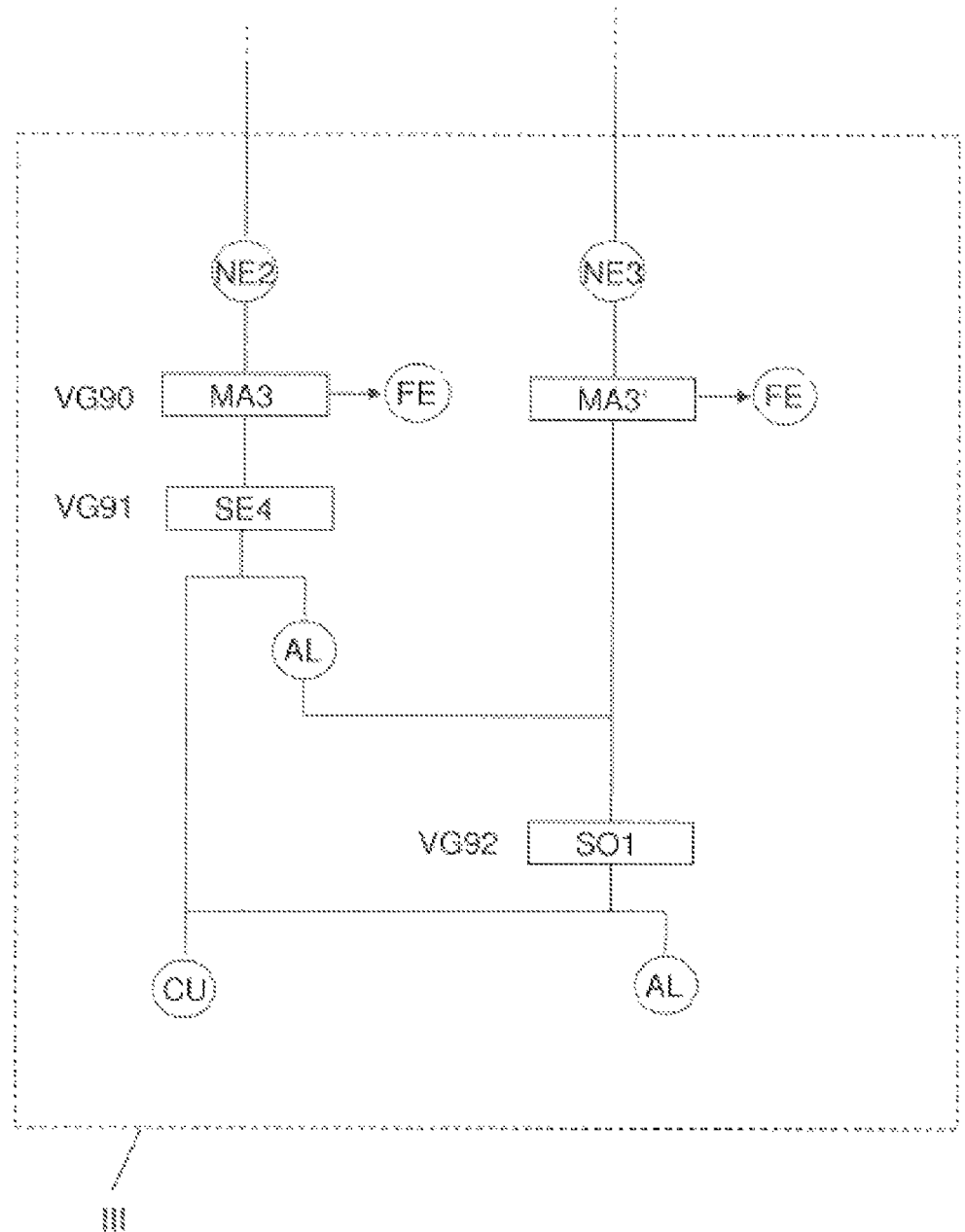
FIG. 3 is a schematic flow chart which shows detail process III of FIG. 2.
Figure 4:
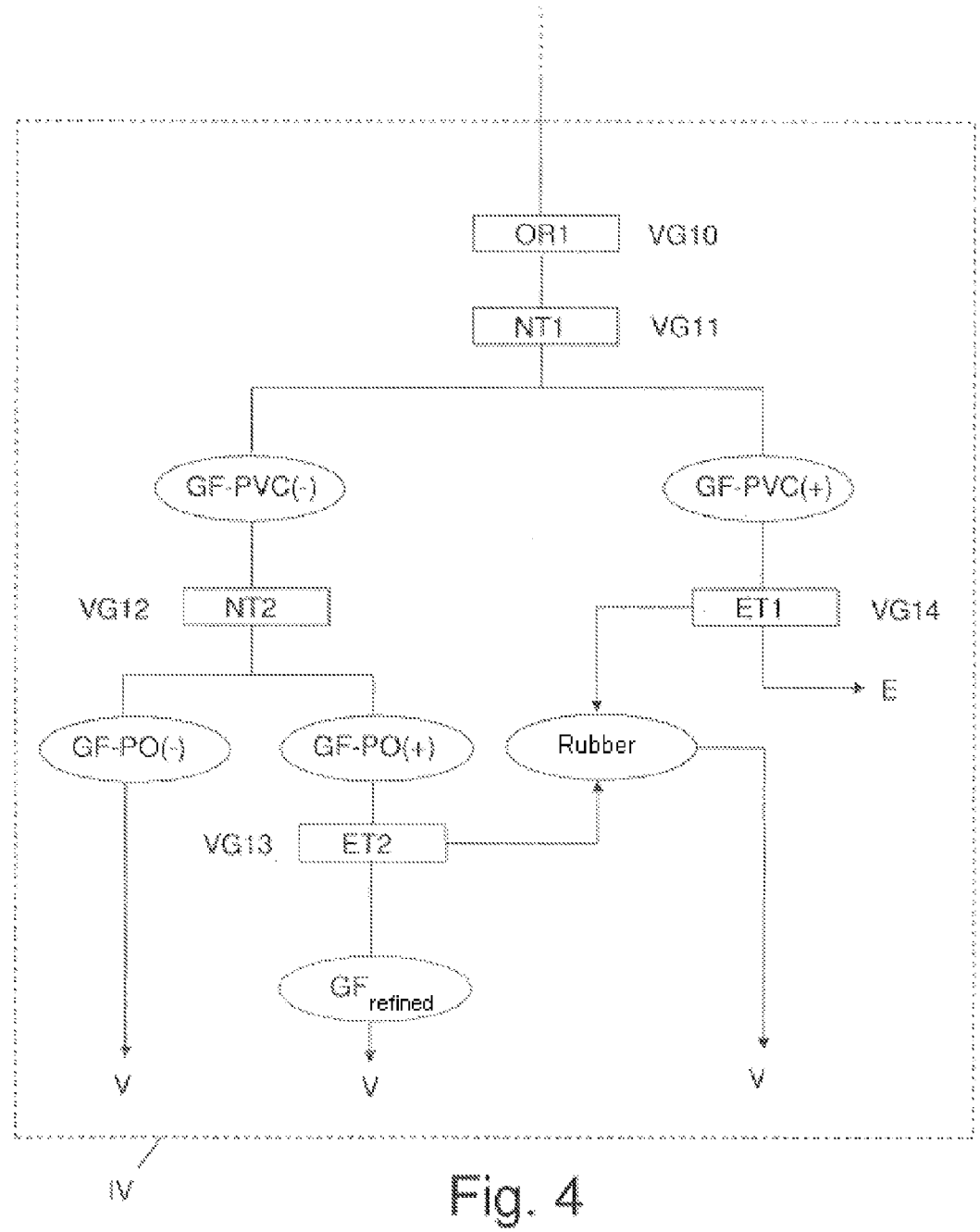
FIG. 4 is a schematic flow chart which shows detail process IV of FIG. 2.

During the refinement, whose sequence is described in detail in FIGS. 2 to 4, the raw granulate SF (heavy fraction) thus produced, in a first process step VG1, is submitted to the segregation of ferromagnetic components FE, which were broken down in process step V5 during the size reduction. For this purpose, one may, for example, use a magnetic separator MA2, e.g., a magnetic drum or an overband magnetic device. This creates a metal-reduced fraction KF high in plastics, which still has a residual proportion of non-ferromagnetic metals NE and high-grade steel components NES. The non-ferromagnetic metals NE are separated in the next process step VG2, and so are high-grade steel components NES, depending on their type of conditioning. If, in this instance, a device for eddy current separation WA1 is used, in this process step VG2 the non-ferromagnetic metals, such as copper, brass, aluminum, etc., are separated, as long as these have been broken down, or rather exposed. Metallic components are separated in this instance, having a grain size >1 mm. A metal-reduced fraction KFA high in plastics remains, which, as far as metals are concerned, then still includes high-grade steel as well as metal components that were not broken down.

Alternatively, in process step VG2, one may also use a method for sensitive metal segregation MS1, based on the electric conductivity of the different metal parts (shown as a dotted line). An advantage of sensitive metal segregation is that, besides the non-ferromagnetic metals, high-grade steel, lead as well as non-broken down metals are separable, and are therefore able to be fed to separate metal conditioning. The sensitivity is adjustable, in this context, and with that, so is the desired quality of the separated metal fraction. Setting a low sensitivity leads to a very clean metal fraction, while increasing the sensitivity also increasingly brings with it the isolation of a cable fraction. When the sensitive metal segregation is used, process step VG1 may perhaps be omitted.

Fraction KFA that is high in plastics, which is obtained in process step VG2, has a PVC component, which is frequently in the range of 4 to 8%. The grain size of the fraction is >5 mm, e.g., >10 mm. In next optional process step VG3, the high chlorine PVC proportion, which also frequently has increased lead and cadmium values, is separated via its absorption capability of X-rays. This takes place in an X-ray separation system XR1. The low-chlorine plastics fraction thus obtained has a chlorine content of 0.6 to 1%. Alternatively or also optionally, the high-chlorine PVC proportion may also come about already before process step VG1 (segregation of ferromagnetic components FE). The PVC isolation, as a rule, takes place substantially in a downstream process step of a wet density separation (VG11, cf. FIG. 4), which takes place in the case of smaller grain sizes, and will still be explained below. In process step VG4, there is a size reduction of this fraction to a grain size <8 mm, e.g., less than, or equal to 7 mm. As the method, one may select a cutting size reduction ZA1, with the aid of cutting mills, by which a breaking down of the non-broken down metals in the range of >99% takes place. This process step is important, above all, when in process step VG2 an eddy current separation has been used, by which the non-broken down metal composites are not separated. It is to be expected that method step VG4 may also take place in several stages. The reduction in size may take place, for example, in two stages, in each case one intermediate buffering being possible. For instance, it is possible to first to carry out a size reduction to a grain size less than, or equal to 14 mm, e.g., less than, or equal to 12 mm, and subsequently (perhaps after intermediate buffering) to post-connect a second size reduction to a grain size less than, or equal to 8 mm, e.g., less than, or equal to 7 mm.

Method step VG4 is followed by an isolation VG5 of the plastic light particles and the wooden particles created by the breaking down, by air sifting WS1, and, for example, equipment WS1 is made to be controllable, so that wood particles are also able to be blown out. In this context, the residual moisture of the materials is measured, and the suction speed is regulated as a function of the residual moisture. In subsequent process step VG6, there is a separation of the remaining fraction into three fractions of different grain size by a sifting SE3 having at least three sieve layers of a different size of hole. Metal-reduced fraction KF1 high in plastics, having a grain size in the range of about 0 mm to approximately 1.5 mm, metal-reduced fraction KF2 high in plastics, having a grain size of approximately 1.5 mm to approximately 4 mm and metal-reduced fraction KF3 high in plastics, having a grain size of approximately 4 mm to approximately 7 mm are obtained. Components that are larger, are reverted to process step VG4 (repeated size reduction, reversion not represented in greater detail).

Fractions KF1 to KF3 that are metal-reduced and high in plastics, are conditioned as follows in different processes. If, by any chance, in the preceding process sequence, process step VG5 of isolating the textile and wood particles is omitted, the method step of air sifting WS2 may be provided in the three process sequences as process step VG7 (indicated by dotted lines), To be sure, this has the result that the apparatus expenditure is increased, since a plurality of devices has to be provided for air sifting. In the process sequences for individual fractions KF1 to KF3, a separation of non-ferromagnetic metal parts (process step VG8) follows process step VG7, or process step VG6, if air sifting WS1 had already been carried out in process step VG5. The separation of the non-ferromagnetic metal parts takes place with the aid of density separation DT1 to DT3, and in a particular arrangement, a cascade-shaped density separation, for example, a dual one, may be provided, since always only one fraction is able to be separated in a clean manner.

After density separation DT1 of plastics fraction KF1, a ground plastics material KM is obtained which, together with the raw lint from the first conditioning of the low-metal scrap KA high in plastics (FIG. 1, LF) is able to be fed to a utilization. Plastics ground material KM is a low-chlorine plastic having a chlorine proportion <1%. As the second fraction, a non-ferromagnetic metal fraction NE is obtained, which, if necessary, is once more fed to a magnetic segregation, in order to isolate the residual ferromagnetic components. Thereafter, non-ferromagnetic metal fraction NE is made up to the greatest extent of copper.

After density separation DT2 of metal-reduced fraction KF2 high in plastics, a prerefined granulate fraction GF1 and a ferromagnetic metal fraction NE2 are obtained. After density separation DT3 in process step VG8 of metal-reduced fraction KF3 high in plastics in the range of about 4 mm to 7 mm, a non-ferromagnetic metal fraction NE3 and a prerefined granulate fraction GF2 are obtained. Granulate fraction GF2 together with granulate fraction GF1 is fed to an additional conditioning (cf. detail process IV in FIG. 2 and FIG. 4), both granulate fractions GF1, GF2 being able to be fed to an intermediate storage (buffer P1) for the decoupling of the additional process steps. Non-ferromagnetic metal fraction NE3 is conditioned together with non-ferromagnetic metal fraction NE2 (cf. detail process III in FIG. 2 and FIG. 3).

FIG. 3 describes detail process III of FIG. 2 in greater detail. Non-ferromagnetic metal fraction NE2 obtained after density separation DT2 receives predominantly copper, but also some aluminum, however, ferromagnetic fraction NE3 obtained after density separation DT3 receives predominantly aluminum, but also some copper. The reason is that, in preceding process step VG4 of cutting size reduction ZA1, one is not able to cut the aluminum so well (it is rather pressed to form larger, flat platelets) but one is able to cut copper quite well. Therefore, the copper is to be found predominantly in finer fraction NE2.

Before the separation of the non-ferromagnetic metal fractions into their components, these are first submitted to a magnetic separation MA3 or MA3' (for instance, a magnetic drum) in a process step VG90, with the aim of isolating possibly still present finest FE components (so-called small section steel). In order to separate non-ferromagnetic metal fractions NE2 and NE3 into their components copper CU and aluminum AL it is provided first to feed metal fraction NE2 to a sifting SE4 in process step VG91. The sieve hole sizes may amount, in this instance, to about 0.9 mm, e.g., 1.5 mm to 2.5 mm. This yields an almost pure copper fraction CU and an aluminum fraction AL. Aluminum fraction AL is subsequently fed to metal fraction NE3 (predominantly aluminum). Thereafter, the material steam thus obtained is fed in process step VG92 to an optical sorting SO1, the optical sorter being set to the minority fraction copper (="red"), and separates it (blows it out). The high purity copper separated in process steps VG91 and VG92 may be fed together to a metallurgical utilization. Similarly, the aluminum separated in process step VG92 may be fed to a metallurgical utilization.

An impact treatment may be inserted before the optical sorting (process step VG92), so as to achieve the balling up of the copper strands. This makes possible a clear increase in efficiency of the optical sorting.

In FIG. 4 it is described how the prerefined granulate fractions GF1 and GF2 are processed further in common.

Thus, in process step VG10, there is a surface purification OR1 of granulate particles, to remove dust and operating fluids such as fats and oils, which also have partially diffused into the plastics. Surface purification OR1 may take place both dry and wet, by the addition of water, by purifying the granulate fractions in a centrifuge, using water. If necessary, one may add non-foaming surface-active agents to the water, depending on the degree of soiling. After that, in process step VG11, a first wet density separation NT1 is carried out, in which splitting up of the substances takes place with respect to their specific density. A severance cut may be provided for this purpose, which is at approximately 1 to 1.5, e.g., at about 1.25. At this severance cut, the requirements of blast furnaces on the chlorine content are easily satisfied. However, depending on the requirements, other severance cuts are also possible. For the separation, for example, a separating fluid, may be added to the water which changes the density of the water such that the so-called acceptable quality fraction, having a reduced chlorine content, floats, and the PVC is separated as the settling fraction. Before the separating container used, the granulate fraction is mixed with the separating fluid in a slurrying container (it also being possible to make a quantity-controlled feeding to the slurrying container so as to be able to regulate the solid content) and is fed in common to the separating container while maintaining laminar flow. For this it is possible to use a separating container having disks, which combines the advantages of laminar separation with those provided in disk separation techniques of waste water treatment. The separating fluid is held to a temperature in order to avoid fluctuations in the density. Magnesium sulphate $MgSO_4$ is used as the separating fluid, for example. The proportion of water in the separating fluid (temperature dependent) is about 20 to 25%. In this connection, a splitting up takes place into a granulate fraction high in PVC (GF-PVC(+)) and one that is low in PVC (GF-PVC(−)). The rubber proportion of the granulate fraction high in PVC GF-PVC(+) still amounts to 30 to 40%, and in a process step VG14 this being fed to an electrostatic isolation ET1, and the rubber proportion being considerably reduced. The separated rubber proportion may be fed to a utilization V, and the rest of the granulate fraction high in PVC GF-PVC(+) is fed to a waste disposal E, such as a landfill. Consequently, with respect to the granulate fraction high in PVC GF-PVC(+) as well, one is able to achieve a reduction in the waste disposal quantity and an increase in the utilization quantity.

The granulate fraction low in PVC GF-PVC(−) obtained in process step VG11 is submitted in a subsequent process step VG12 to a second wet density separation NT2 using water, e.g., in order to separate polyolefins (e.g., PS, PE, PP, ABS, PA) from this granulate fraction. In this regard, a severance cut with respect to the specific density of about 0.8 to 1.2, e.g., 1.0, may be provided, although in this case, too, other values are possible, depending on the requirement. In wet density separation NT2, a granulate fraction high in PVC (GF-PVC(+)) and one that is low in PVC (GF-PVC(−)) are created. The granulate fraction high in polyolefin (GF-PO(+)) obtained is made up substantially of PE and PP, and has a rubber proportion of <2%, which in method step VG13, at least to a great extent, is also removed or reduced by electrostatic isolation ET2. One obtains a refined granulate fraction $GF_{refined}$, which is able to be fed to a (working material) utilization V having a high quality requirement. Refined granulate fraction GF$_{refined}$, if necessary, may be fed to an additional size reduction (regrinding), if postconnected utilization processes require it. Granulate fraction GF-PO(−) that is low in polyolefin, is also fed to a utilization V.

LIST OF REFERENCE CHARACTERS

B1, B2 feed container
DT1-DT3 density separation
E waste disposal
ET1, ET2 electrostatic isolation
FE ferromagnetic components
GF1, GF2 granulate fraction
GF-PVC(+) granulate fraction high in PVC
GF-PVC(−) granulate fraction low in PVC
GF-PO(+) granulate fraction high in polyolefin
GF-PO(−) granulate fraction low in polyolefin
GF$_{refined}$ refined granulate fraction
HM hammer mill
KA low-metal scrap high in plastics
KF metal-reduced fraction high in plastics
KFA metal-reduced fraction high in plastics
KF1 to KF3 metal-reduced fractions high in plastics
KM plastic ground material
LF light fraction (raw lint)
MA1, MA2, MA3, magnetic separator
MA3'
MS1 sensitive metal segregation
NE1 device for segregating non-ferromagnetic metal parts
NE, NE2, NE3 non-ferromagnetic metal parts
NES high-grade steel components
NT1, NT2 wet density separation
OR1 surface purification
PVC settling fraction
P1 buffer,
RS1 first raw sand fraction
RS2 second raw sand fraction
SE1 first sifting device
SE2 sifting device
SE3 sifting device
SE4 sifting device
SF heavy fraction (raw granulate)
SG heavy material
SLF light shredder fraction
SO1' optical sorting
SSF heavy shredder fraction
ST device for isolating heavy material
V utilization
V1 to V7 process steps for conditioning low-metal plastic scrap
VG1 to VG13 process steps for conditioning raw granulate SF
WA1 eddy current separation
WS air sifting
WS1, WS2 air sifting
XR0, XR1 X-ray separation
ZA1 cutting size reduction
III detail process
IV detail process

What is claimed is:

1. A method for conditioning a heavy fraction high in plastics obtained in a conditioning of low-metal material mixtures high in plastics, comprising:
  isolating metal parts from the heavy fraction high in plastics to obtain a metal-reduced heavy fraction high in plastics;
  reducing a size of the metal-reduced heavy fraction high in plastics that remains after the isolation of the metal parts;
  separating the metal-reduced heavy fraction high in plastics that remains after the isolation of the metal parts, into fractions high in plastics having different grain sizes; and
  conditioning the separated fractions high in plastics at least partially in separate processes.

2. The method according to claim 1, wherein the conditioning of the separated fractions high in plastics is at least partially performed in similar separate process steps.

3. The method according to claim 1, wherein the fraction high in plastics is separated in the separating into a first fraction high in plastics having a grain size of at least one of (a) 0 to 1.7 mm and (b) 0 to 1.5 mm, a second fraction high in plastics having a grain size of at least one of (a) 1.3 mm to 4.2 mm and (b) 1.5 mm to 4.0 mm, and a third fraction high in plastics having a grain size of at least one of (a) 3.8 mm to 7.2 mm and (b) 4.0 to 7.0 mm.

4. The method according to claim 1, wherein the heavy fraction high in plastics on average has a bulk material weight of at least one of (a) greater than 0.2 t/m$^3$ and (b) greater than 0.4 t/m$^3$.

5. The method according to claim 1, wherein the isolating of the metal parts includes (a) isolating ferromagnetic components and (b) isolating non-ferromagnetic metal parts.

6. The method according to claim 5, wherein the isolating of non-ferromagnetic metal parts includes at least one of (a) eddy current separation and (b) sensitive metal segregation based on electrical conductivity of the metal parts.

7. The method according to claim 1, further comprising, after the isolating of metal parts, at least one of (a) separating PVC high in chlorine and (b) separating PVC high in chlorine via different absorption capability of X-rays.

8. The method according to claim 1, wherein the reduction in size is performed at a grain size of less than or equal to 7 mm.

9. The method according to claim 8, wherein the reduction in size is performed such that a breaking down takes place of the metals not broken down of at least one of (a) greater than 95% and (b) greater than 99%.

10. The method according to claim 1, further comprising, after the reduction in size, separating at least one of (a) raw lint, (b) raw lint having an average bulk material weight of less than 0.3 t/m$^3$, (c) raw lint having an average bulk material weight of less than 0.2 t/m$^3$, and (d) wood particles.

11. The method according to claim 1, wherein the separating includes at least one of (a) sifting and (b) sifting using at least three sieve layers of different hole sizes.

12. The method according to claim 1, further comprising submitting, independently of one another, the fractions high in plastics to a separation of at least one of (a) raw lint, (b) raw lint having an average bulk material weight of less than 0.3 t/m$^3$, (c) raw lint having an average bulk material weight of less than 0.2 t/m$^3$, and (d) wood particles.

13. The method according to claim 1, further comprising submitting a fraction high in plastics having a grain size of at least one of (a) 0 to 1.7 mm and (b) 0 to 1.5 to a density separation to produce, as an end product, a non-ferromagnetic metal fraction and a plastics ground material.

14. The method according to claim 13, wherein the plastics ground material includes a low-chlorine plastic having a chlorine proportion of less than 1%.

15. The method according to claim 1, further comprising submitting a fraction high in plastics having a grain size of at least one of (a) 1.3 mm to 4.2 mm and (b) 1.5 to 4.0 mm to a density separation to produce, as an intermediate product, a prerefined granulate fraction and a non-ferromagnetic metal.

16. The method according to claim 15, further comprising feeding the non-ferromagnetic metal fraction to a detail process, in which at least a part of the metal fraction is submitted to at least one of (a) a further sorting process and (b) an optical sorting process.

17. The method according to claim 1, further comprising submitting fraction high in plastics having a grain size of at least one of (a) 3.8 mm to 7.2 mm and (b) 4.0 to 7.0 mm to a density separation to produce, as an intermediate product, a prerefined granulate fraction and a non-ferromagnetic metal fraction.

18. The method according to claim 17, further comprising feeding the non-ferromagnetic metal fraction to a detail process, in which at least a part of the metal fraction is submitted to at least one of (a) a further sorting process, (b) an optical sorting process, and (c) an optical sorting process performed in common with a partial flow of another non-ferromagnetic metal fraction.

19. The method according to claim 18, further comprising feeding, before the sorting process, the other non-ferromagnetic metal fraction to at least one of (a) a sifting process and (b) a sifting process performed by a sifting device having a hole diameter of at least one of (i) 0.9 mm to 3 mm and (ii) 1.5 mm to 2.5 mm.

20. The method according to claim 18, further comprising feeding the non-ferromagnetic metal fractions to at least one of (a) an isolation of ferromagnetic components and (b) a magnetic separator.

21. The method according to claim 15, further comprising feeding the prerefined granulate fraction and another prerefined granulate fraction to a detail process, in which the prerefined granulate fractions are submitted to a surface purification for removal of at least one of (a) dust, (b) operating fluids, (c) fats, and (d) oils.

22. The method according to claim 21, wherein the surface purification is performed using water in a centrifuge.

23. The method according to claim 1, further comprising at least one of (a) separating and (b) separating by wet density separation the granulate fraction into a granulate fraction high in PVC and a granulate fraction low in PVC.

24. The method according to claim 23, further comprising at least one of (a) separating and (b) separating by wet density separation the granulate fraction low in PVC into a granulate fraction high in polyolefin and a granulate fraction low in polyolefin.

25. The method according to claim 24, further comprising at least one of (a) isolating and (b) isolating by electrostatic isolation rubber from the granulate fraction high in polyolefin.

26. The method according to claim 24, further comprising at least one of (a) isolating and (b) isolating by electrostatic isolation rubber from the granulate fraction high in PVC.

27. The method according to claim 1, wherein the material mixture high in plastics includes shredder residues of metal-containing scrap.

28. The method according to claim 1, wherein the material mixture high in plastics includes at least one of (a) low-metal scrap high in plastics produced at least partially in vehicle shredder processes, (b) a light shredder fraction, and (c) a heavy shredder fraction.

29. The method according to claim 1, wherein the method is performed by a system for conditioning the heavy fraction high in plastics obtained in conditioning of low-metal material mixtures high in plastics, the system including:
   an isolation device adapted to isolate metal parts from the heavy fraction high in plastics;
   a reduction device adapted to reduce the size of the metal-reduced heavy fraction high in plastics that remains after isolation of the metal parts by the isolation device;
   a first separation device adapted to separate the metal-reduced heavy fraction high in plastics that remains after the isolation of the metal parts by the isolation device, into the fractions high in plastics having different grain sizes; and
   a conditioning device adapted to condition the separated fractions high in plastics at least partially in separate processes.

* * * * *